(12) United States Patent
Raghunathan et al.

(10) Patent No.: US 11,663,174 B2
(45) Date of Patent: May 30, 2023

(54) AUTONOMOUS DEPLOYMENT OF MULTIPLE DATABASE FILE SYSTEMS

(71) Applicant: Oracle International Corporation, Redwood Shores, CA (US)

(72) Inventors: Parthasarathy Elangadu Raghunathan, Bangalore (IN); Shishir Mathur, San Mateo, CA (US); Shubha Bose, Foster City, CA (US); Aurosish Mishra, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 93 days.

(21) Appl. No.: 17/387,708

(22) Filed: Jul. 28, 2021

(65) Prior Publication Data
US 2022/0164320 A1    May 26, 2022

Related U.S. Application Data

(60) Provisional application No. 63/117,366, filed on Nov. 23, 2020.

(51) Int. Cl.
*G06F 16/188* (2019.01)
*G06F 16/13* (2019.01)
(Continued)

(52) U.S. Cl.
CPC ........ *G06F 16/196* (2019.01); *G06F 9/45558* (2013.01); *G06F 9/4881* (2013.01);
(Continued)

(58) Field of Classification Search
CPC .. G06F 16/196; G06F 9/45558; G06F 9/4881; G06F 11/3409; G06F 16/122;
(Continued)

(56) References Cited

U.S. PATENT DOCUMENTS 5,596,745 A    1/1997  Lai
6,922,708 B1   7/2005  Sedlar
(Continued)

FOREIGN PATENT DOCUMENTS

CN    106815251 B    9/2019

OTHER PUBLICATIONS

Zhao, D.,'HyCache: A Hybrid User-Level File System with SSD Caching', Dept of Comp. Science, Illinois Inst. of Tech, Chicago, IL, http://datasys.cs.iit.edu/reports/2012_Qual-IIT_HyCache.pdf, 11pgs.
(Continued)

*Primary Examiner* — Angelica Ruiz
(74) *Attorney, Agent, or Firm* — Hickman Becker Bingham Ledesma LLP

(57) ABSTRACT

A manager file system (MFS) runs as a user space file system. The MFS, implemented using an OS process, exposes a mount point as a communication endpoint to the single process. Mounting, unmounting, and changing configuration of individual database file systems (DBFSs) are done by overloading extended attributes on the mount point. The MFS services all DBFSs mounted at different mount points registered to the single process of the MFS and ensures optimal resource utilization among the DBFSs in the single process while guaranteeing resource isolation. Multiple MFSs may be created to manage sets of DBFSs.

20 Claims, 10 Drawing Sheets

(51) Int. Cl.
  *G06F 9/455* (2018.01)
  *G06F 16/11* (2019.01)
  *G06F 9/48* (2006.01)
  *G06F 11/34* (2006.01)

(52) U.S. Cl.
  CPC ........ *G06F 11/3409* (2013.01); *G06F 16/122* (2019.01); *G06F 16/13* (2019.01); *G06F 2009/45587* (2013.01); *G06F 2009/45595* (2013.01)

(58) Field of Classification Search
  CPC ........... G06F 16/13; G06F 2009/45587; G06F 2009/45595; G06F 2201/815; G06F 16/18
  See application file for complete search history.

(56) References Cited

U.S. PATENT DOCUMENTS

| | | | |
|---|---|---|---|
| 7,072,894 B2 | 7/2006 | Loy | |
| 7,610,268 B2 | 10/2009 | Rossiter | |
| 7,672,981 B1 | 3/2010 | Faibish | |
| 8,239,486 B2 | 8/2012 | Susairaj | |
| 9,881,170 B2 | 1/2018 | Morris | |
| 2007/0088706 A1 | 4/2007 | Goff | |
| 2008/0091743 A1 | 4/2008 | Goff | |
| 2011/0208911 A1* | 8/2011 | Taguchi | G06F 1/3221 711/E12.019 |
| 2016/0110266 A1* | 4/2016 | Nara | G06F 11/1456 707/680 |
| 2016/0117337 A1 | 4/2016 | Aron | |
| 2018/0322136 A1 | 11/2018 | Carpentier | |
| 2022/0164321 A1 | 5/2022 | Raghunathan et al. | |
| 2022/0164322 A1 | 5/2022 | Raghunathan et al. | |

OTHER PUBLICATIONS

Stepanov, Konstantin, 'fusqlfs—FUSE file system to mount DB and provide tools to control and admin it', 2010, printed on Oct. 14, 2020 https://github.com/kstep/fusqlfs, 8pgs.

Rajgarhia, A., et al., 'Performance and Extension of User Space File Systems', SAC '10 Mar. 22-26, 2010, Sierre, Switzerland, https://core.ac.uk/download/pdf/193586624.pdf, 2010 ACM, 8pgs.

Pavlinusic, Dobrica, 'Fuse:DBI—mount your database as filesystem and use it', https://www.rot13.org/~dpavlin/fuse_dbi.html, updated Jan. 8, 2016. 9pgs.

'Makes a file system available for use', IBM Search in AIX 7.1 mount Command, Purpose, printed Oct. 14, 2020, https://www.IBM.com/docs/en/aix/7.1?topic=m-mount-command, 26pgs.

Kashyap, S., et al., 'Improving Database Performance With AIX Concurrent I/O', IBM corp 2003, https://pdfs.semanticscholar.org/9e86/832bc2639ee331f091b61cbcc5f84847cc4f.pdf, May 27, 2003, 13pgs.

'Dimensions CM, UNIX Installation Guide', 2019 Micro Focus, https://admhelp.microfocus.com/dimensionscm/en/14.5.1/PDF/dmcm_unixJnstallation_guide.pdf, updtd Dec. 9, 2019; 188pgs.

Di Pierro, Massimo, 'WEB2PY Complete Reference Manual, 5th Edition', downloaded from http://web2py.com/books/default/chapter/29/13/deployment-recipes?search=Daemon, build date Mar. 3, 2013. 614pgs.

'Atomic Commit in SQLite', SQLite, printed Oct. 12, 2020, https://sqlite.org/atomiccommit.html#section_3_6, 25pgs.

* cited by examiner

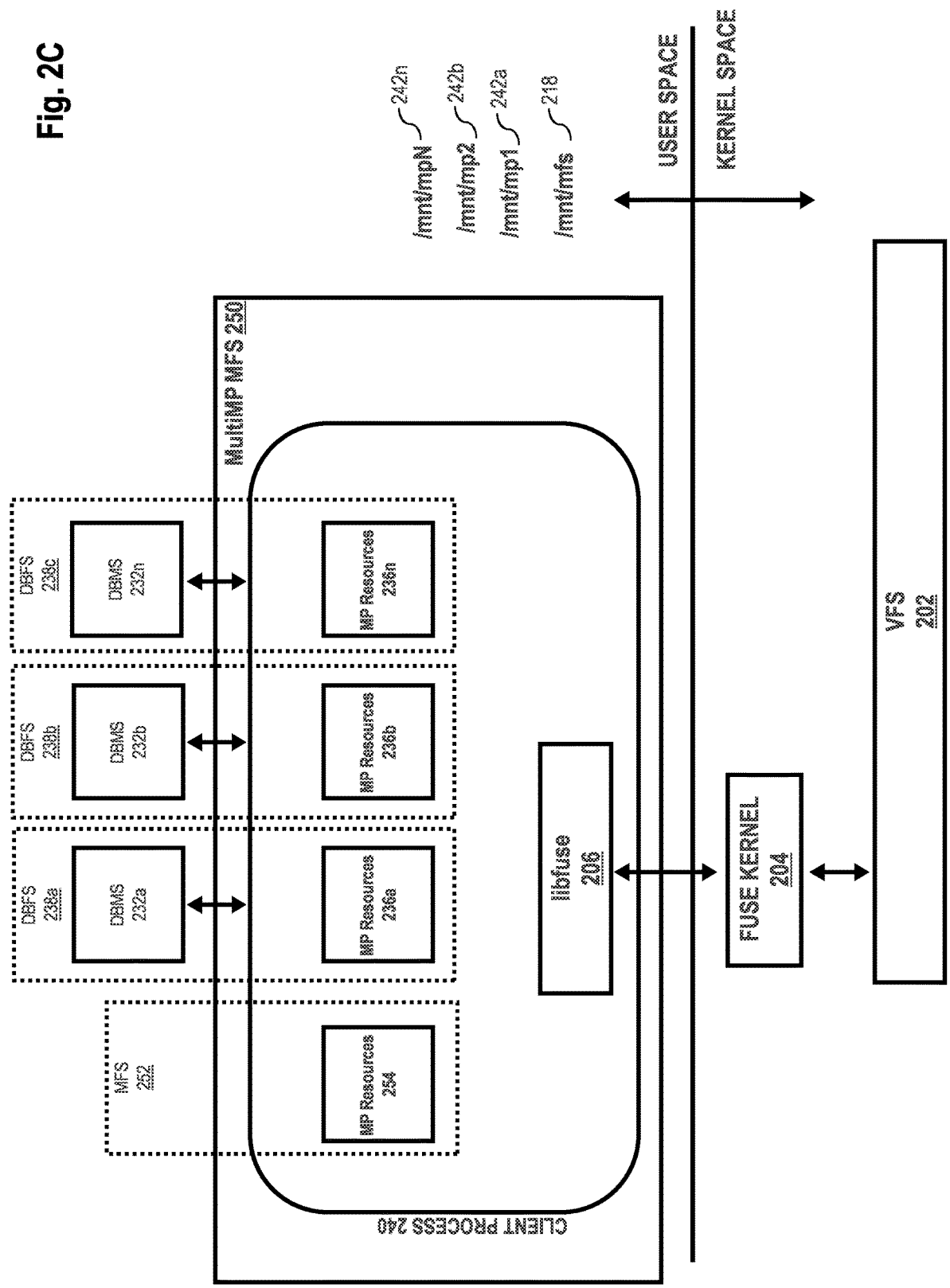

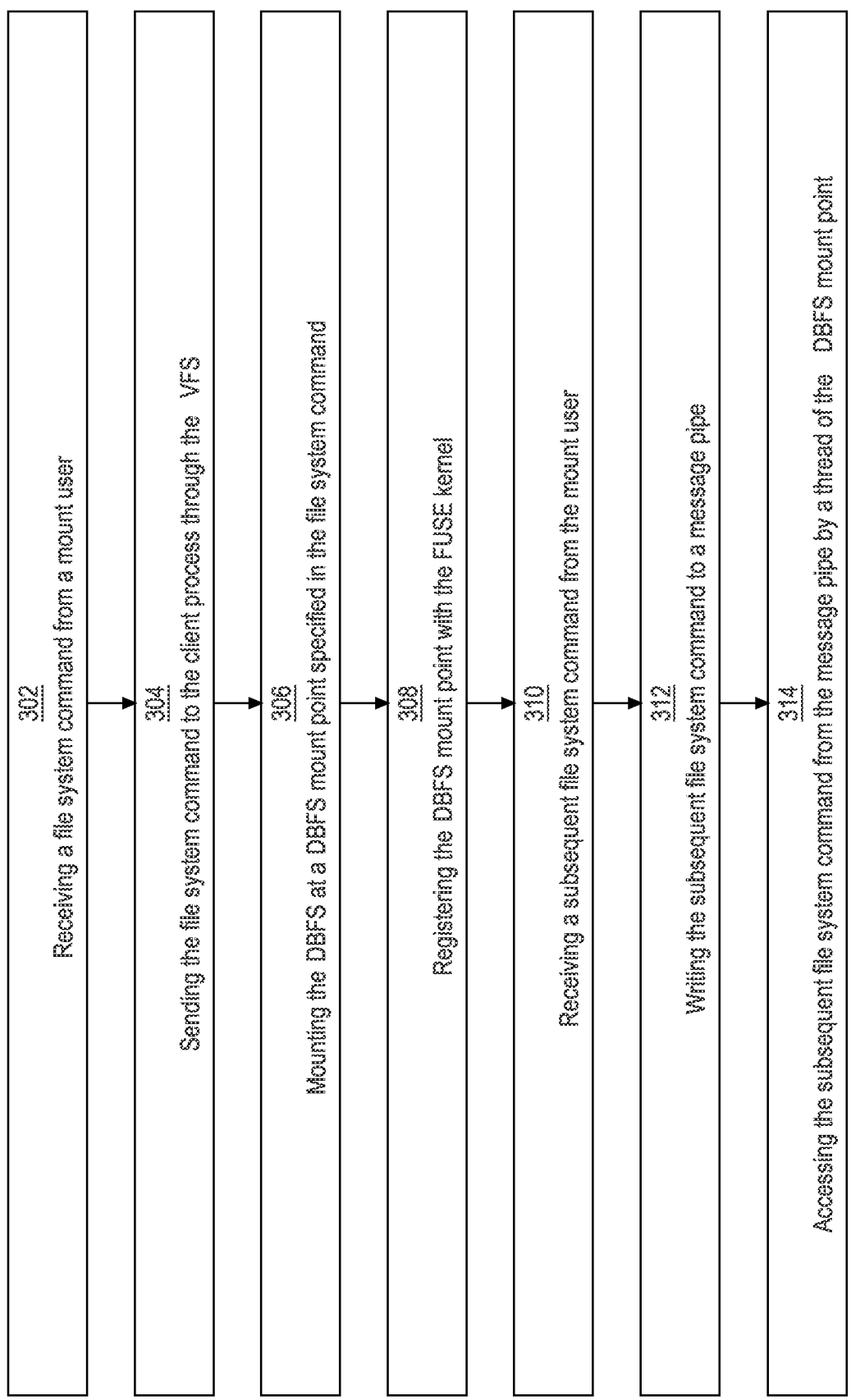

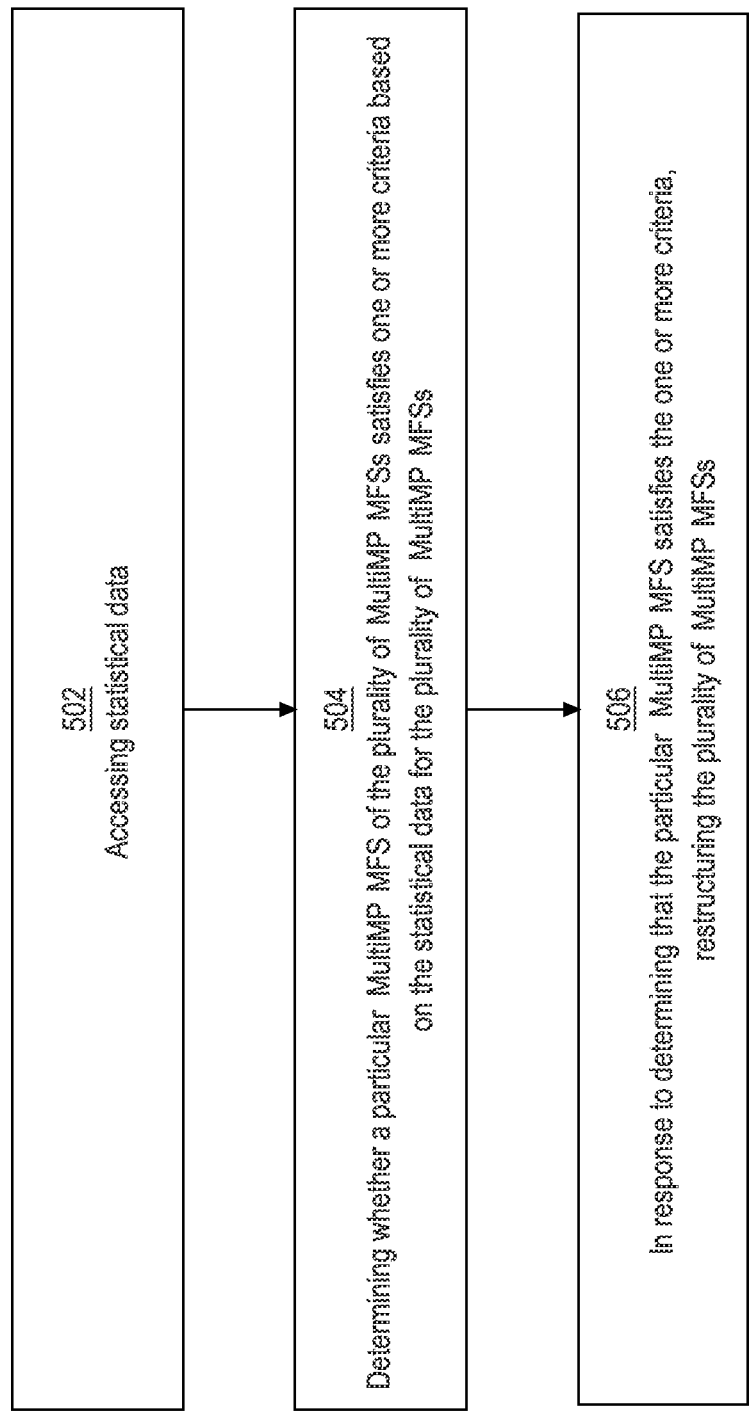

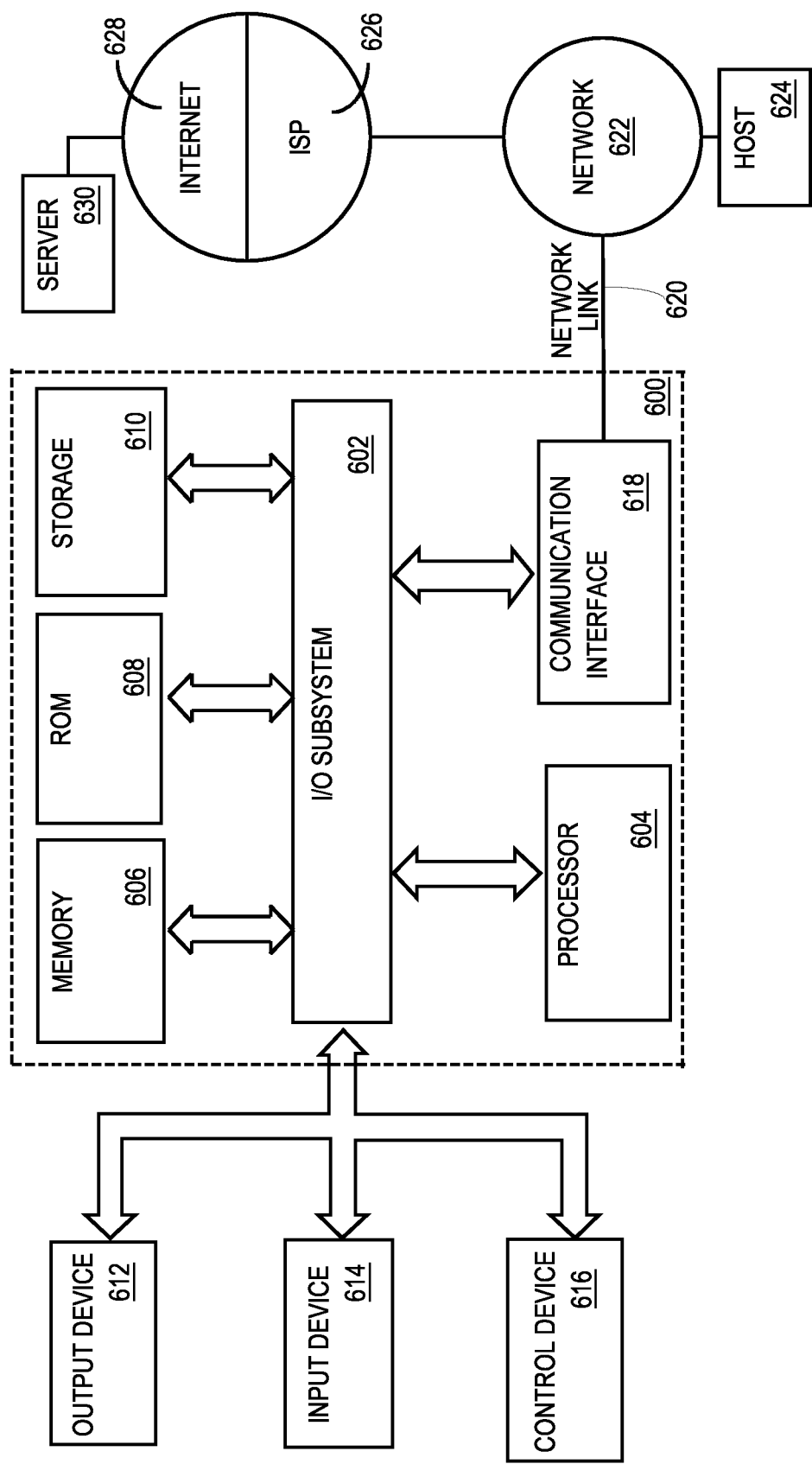

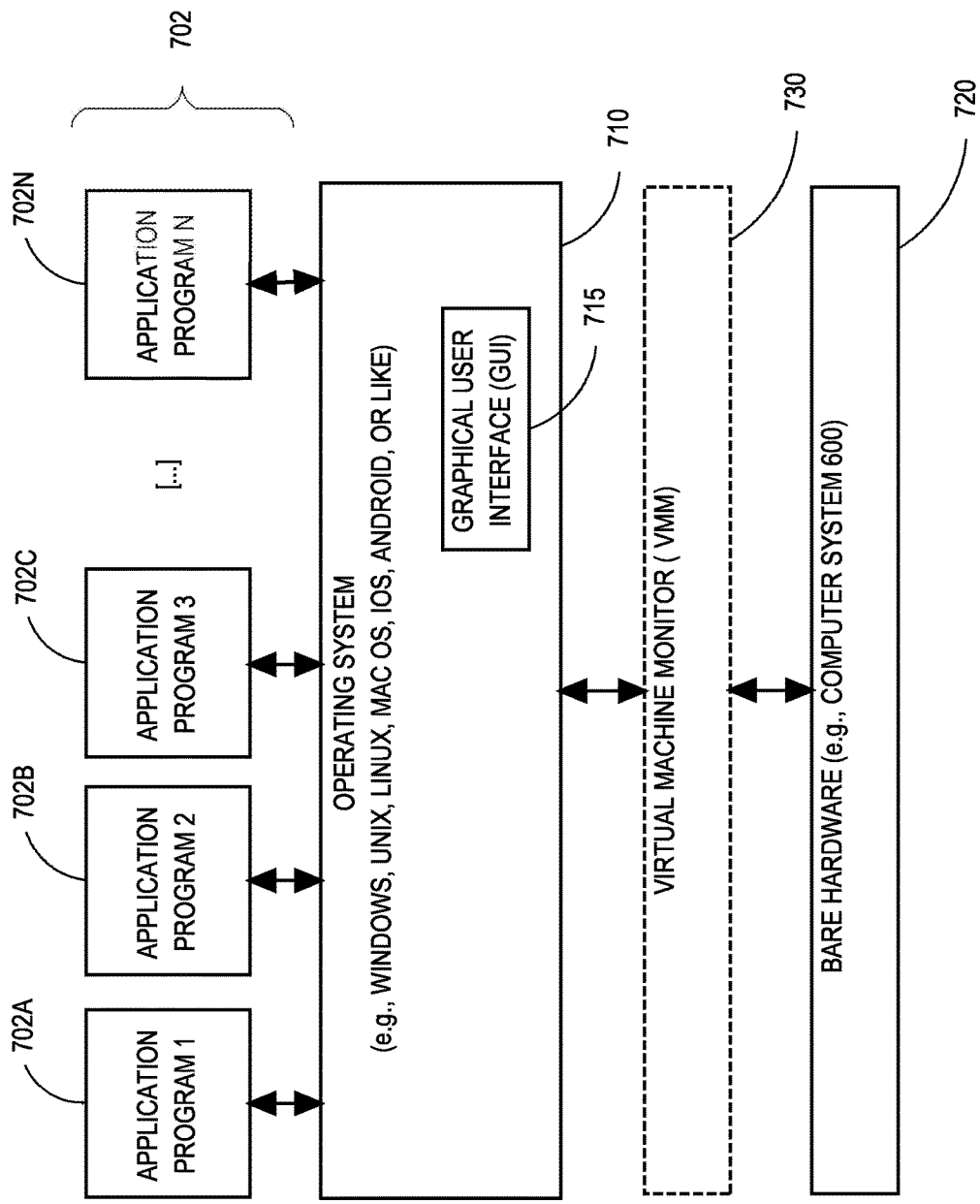

AUTONOMOUS DEPLOYMENT OF MULTIPLE DATABASE FILE SYSTEMS

BENEFIT CLAIM

This application claims the benefit under 35 U.S.C. § 119(e) of provisional application 63/117,366, filed Nov. 23, 2020, the entire contents of which is hereby incorporated by reference for all purposes as if fully set forth herein.

FIELD OF THE INVENTION

The present invention relates to autonomously deploying different database file systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database file system (DBFS) is mounted at a single mount point as a user space file system in an operating system. An example of a user space file system is File System in User Space (FUSE), available in UNIX and Linux file systems. When mounted, a single dedicated user space client process is established for the DBFS and its respective mount point to handle file system commands directed to the mount point. This requires the number of client processes to be directly proportional to the number of mount points to be serviced. This requirement substantially impairs scalability and limits the number of DBFSs that may be instantiated on a computer system. In addition, there does not exist a single point of control for managing multiple DBFSs, making management and monitoring of the client processes difficult. Each mount point must individually managed as an independent application. Furthermore, resources, such as memory and threads, cannot be efficiently allocated between the mount points. For example, resources available within one of the client processes cannot be shared with other resources of other client processes.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 2C illustrates a block diagram of a multi-mount point MFS.

FIG. 3 illustrates a flow diagram that depicts a method of servicing DBFSs.

FIGS. 5A, 5B each illustrates a flow diagram that depicts a method of autonomously managing a deployment configuration.

FIG. 6 illustrates a block diagram of a computing device in which the example embodiment(s) of the present invention may be embodiment.

FIG. 7 illustrates a block diagram of a basic software system for controlling the operation of a computing device.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A manager file system (MFS) runs as a user space file system. Commands mimicked as file system commands may be directed to the mount point of the MFS. However, the MFS does not respond to them as file system commands but, instead, responds by performing operations to manage any number of user space file systems. These commands are referred to herein as overloaded commands. As indicated, overloaded commands are used to manage other user space file systems.

The MFS may be referred to herein as a pseudo-file system because users and applications interact with the MFS to a degree as if it were a file system mounted at a mount point. However, the MFS manages no file under the mount point but is instead used to manage other applications, and in particular, other user space file systems mounted at other mount points. Examples of a user space file system include a DBFS, a storage file system such as GlusterFS, and proprietary and open source file systems.

According to an embodiment, a client process of the MFS serves as a single controlling process for other "managed" user space files systems, including DBFSs. Different user space file systems are concurrently mounted at different mount points registered to the single client process of the MFS. The client process is multi-threaded, with a set of threads dedicated to each single user space file system. This approach allows flexibility and automated control for sharing process resources, like threads and memory, among different user space file systems. Isolation of resources between the respective threads of user space file systems is also provided.

Techniques discussed herein describe the MFS as an interface for DBFSs, but embodiments are not limited to this example.

Database File System Architecture

Figure 1:
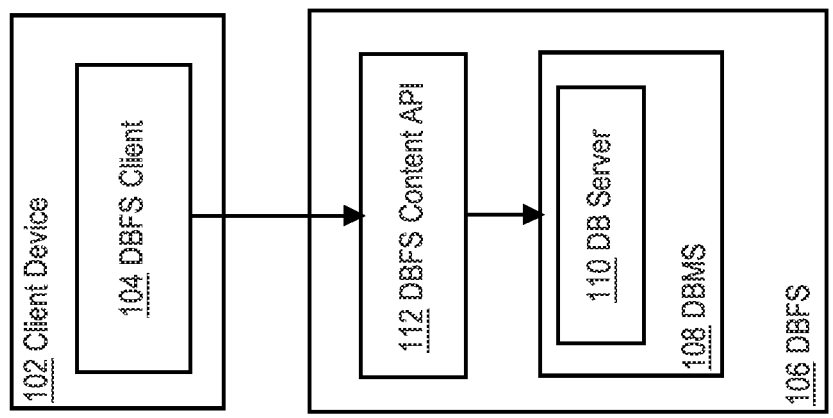
FIG. 1 is a block diagram that depicts an example network arrangement for a DBFS.

FIG. 1 is a block diagram that depicts an example network arrangement 100 for a database file system. A database file system (DBFS) 106 leverages database system's ability to store files and to efficiently manage relational data. The DBFS 106 provides a client-server file system abstraction over files stored in a database allowing users to perform network file system operations within the database using standard file system interfaces instead of standard database interfaces. The DBFS 106 provides a transparent abstraction layer of a shared network file system as a local file system to a client.

A client device 102 is communicatively coupled with a database management system (DBMS) 108. The client device 102 may be implemented by any type of computing device.

The DBMS 108 manages a database and may include one or more database servers 110. The client device 102 interacts with the database server 110 of the DBMS 108 by submitting to the database server 110 commands that cause the database server 110 to perform operations on data stored in the database.

The DBMS 108 is in effect the file system server for the DBFS 106. The file system server includes one or more file system stores that are accessed by a set of interfaces called DBFS Content API 112. A file system store is characterized by one or more database objects including, but not limited to, tables, table partitions, and indexes. The DBFS Content API 112 provides database interfaces that correspond to a set file system access primitives. For example, a file system command may be to retrieve data, which may correspond to a database command to retrieve data from tables.

The client device 102 may be configured with a DBFS client 104. The DBFS client 104 may be implemented in any number of ways, including as a stand-alone application running on the client device 102. The DBFS client 104 may be implemented by one or more logical modules. The client device 102 may be configured with other mechanisms, processes, and functionalities, depending upon a particular implementation to interact with the DBFS client 104.

Embodiments of the DBFS client 104 may use different mechanisms including but not limited to FUSE to expose file system calls from the operating system kernel as function callbacks in user space. The DBFS client 104 then transforms the function callbacks to the equivalent database interfaces provided by the DBFS Content API 112 and sends the database call to the DBMS 108. Client-user file system requests that are related to the files within the DBFS file system are then converted into database operations. The DBFS file system is mounted on a client machine at a mount point as described below. File system operation requests from a mount user directed to the mount point are translated by the DBFS client 104 to their corresponding database operation requests and sent to the DBMS 108.

An example DBFS architecture is described in U.S. Pat. No. 6,922,708, titled "File System that Supports Transactions," issued on Jul. 26, 2005, by Eric Sedlar, the entire contents of which is hereby incorporated by reference for all purposes as if fully set forth herein.

File System Userspace (FUSE)

FUSE is a module in a Unix and Unix-like computer operating system (OS), such as Linux, that allows a user-space process to register itself with the OS as a service provider for a user-defined file system. Once the user-defined file system is mounted, the FUSE kernel module registers the file system with the virtual file system (VFS). Registration of the user-defined file system involves providing an implementation to a pre-defined file system interface (e.g., read( ), write( ), mkdir( ), etc.) by invoking an appropriate system call that is available as part of FUSE.

The user-space process exposes a path in the native file system as the root of its file system (mount point). It informs the OS kernel that any file system operation whose path contains the mount point as its prefix (e.g., file system calls issued to the mount point), should be handed over or forwarded to this process, through the VFS, by invoking the appropriate interface method that this process implements as part of its file system implementation.

Manager File System (MFS)

Figure 2A:
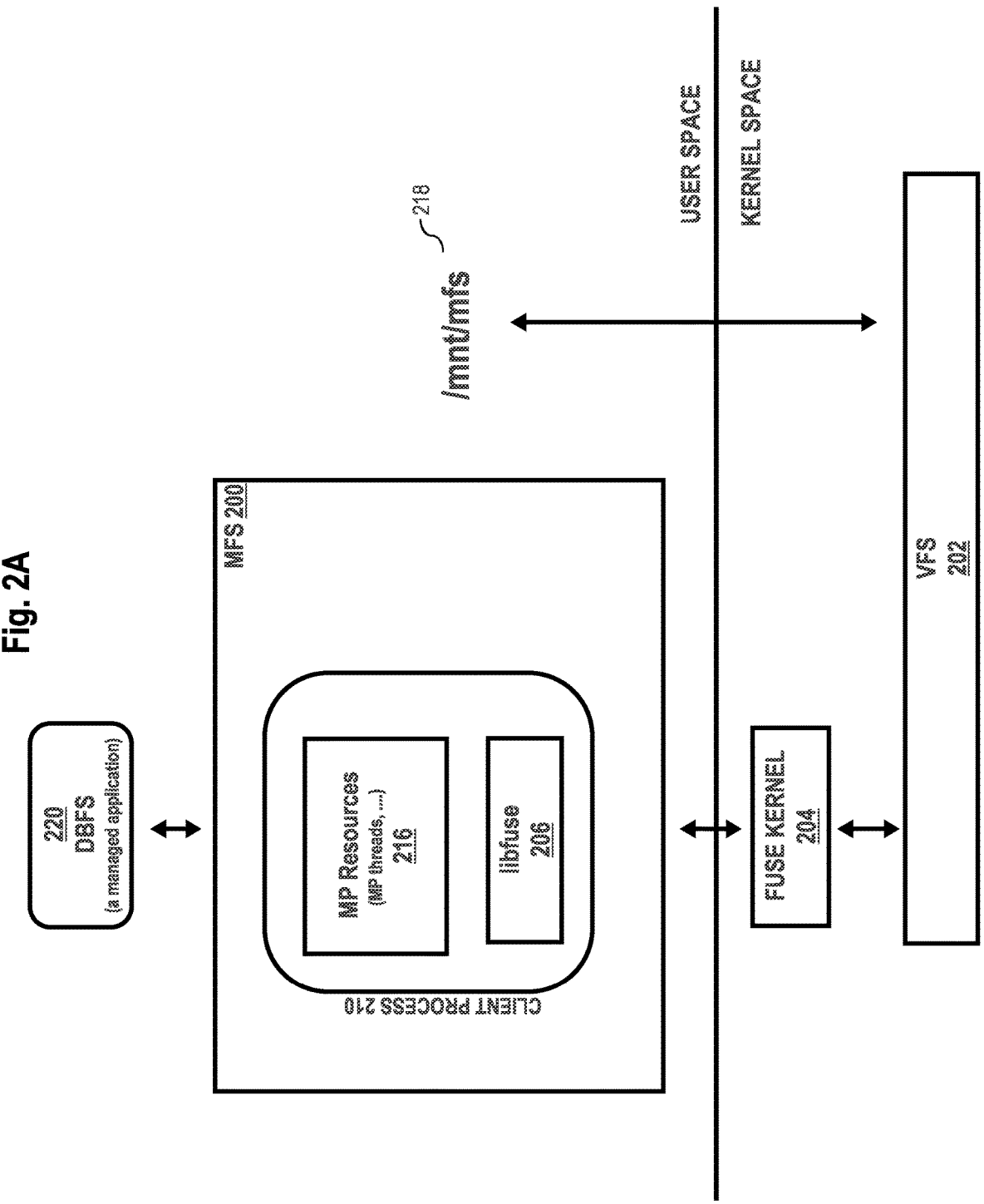
FIG. 2A illustrates a block diagram of an MFS.
Figure 2B:
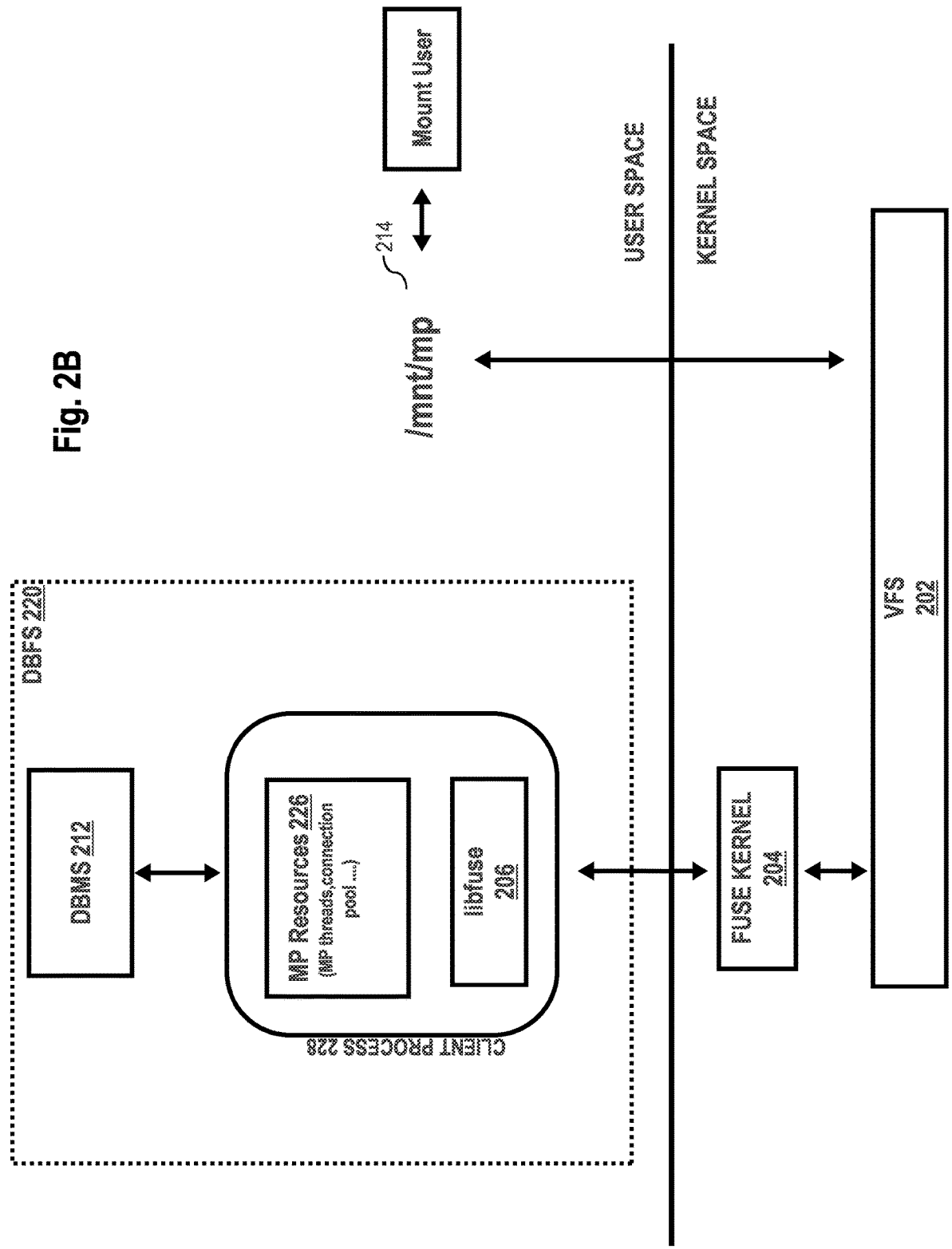
FIG. 2B illustrates a block diagram of a user space file system DBFS.

An MFS, which exists in user space of an OS, can be used to manage and provide security and access controls to "MFS managed" applications, such as processes, configurations, and user space file systems. An MFS is a pseudo file system which utilizes a file system interface to which overloaded commands may be directed to control and configure one or more MFS managed applications. FIG. 2A illustrates MFS 200 and FIG. 2B illustrates user space file system DBFS 220, an example of an MFS managed application.

Referring to FIG. 2A, the MFS 200 represents an MFS implementation according to an embodiment. The MFS 200 is implemented using a client process 210. The client process 210 registers itself with FUSE kernel module 204, as the file system service provider of a specified mount point, which is MFS mount point 218 (i.e., /mnt/mfs). In an embodiment, the MFS 200 is instantiated by specifying the "mfs_mount" command line option as follows dbfs_client -o mfs_mount=/mnt/mfs, where "/mnt/mfs" is the MFS mount point 218. The MFS 200 exposes the MFS mount point 218 (i.e., /mnt/mfs) to in effect act as a communication endpoint to the client process 210. Any file system operation issued on a path that has the MFS mount point 218 (i.e., /mnt/mfs) as a prefix is redirected by VFS 202 to the client process 210 through the FUSE kernel module 204 and libfuse 206. This redirection ensures that every file system operation is associated with an OS user's credentials, which are already authenticated by the OS. MP resources 216 are computer resources dedicated to the MFS 200, such as one or more dedicated mount point threads (MP threads) and memory used to store information about MFS managed applications. As further discussed below, the client process 210 may have a multi-threaded architecture.

In an embodiment, one or more file system operations are overloaded with an implementation of control instructions. For example, a standard file system interpretation of the setfattr file system command is to associate a new value with an extended attribute name for each specified file. However, the command may be overloaded and interpreted by the MFS 200 to, for example, mount or unmount a user space file system, such as DBFS 220 (see also FIG. 2B). File system commands directed to the MFS mount point 218 (i.e., /mnt/mfs) that are supported (e.g., can be interpreted as overloaded commands) by the MFS 200 are serviced accordingly. File system commands directed to the MFS mount point 218 (i.e., /mnt/mfs) that are not supported by MFS 200 may result in an error.

An example MFS is described in U.S. patent application Ser. No. 17/387,724, titled "Techniques for Using an In-Memory Only File System as an Interface for Managing Computer Systems and User Space File Systems," filed on Jul. 28, 2021, by Raghunathan et al., the entire contents of which is hereby incorporated by reference for all purposes as if fully set forth herein.

Base Single File System Client Process

FIG. 2B is a block diagram that depicts user space file system DBFS 220, which uses one client process to service only one user space file system. The DBFS 220 is mounted at mount point 214 (i.e., /mnt/mp). The DBFS 220 may be mounted by sending the overloaded setfattr file system command to the MFS mount point 218 (i.e., /mnt/mfs), which is the mount point of the MFS 200 of FIG. 2A. The overloaded file system command specifies a mount point 214 (i.e., /mnt/mp). An example of an overloaded file system command is setfattr -n mount -v "inst1 /mnt/mp" /mnt/mfs. This command sets the extended attribute "mount" on the database system pointed to by "inst1." Connection information, such as server name, port and system identifier, for connecting with "inst1" may be provided in a configuration file and retrieved therefrom to establish a connection to a DBMS 212, which manages the database that stores file data and file metadata for the DBFS 220. The DBFS 220 is mounted at the mount point 214 (i.e., /mnt/mp), and MP resources 226 are generated for the DBFS 220. The MP resources 226 include MP threads dedicated to the DBFS 220 within the client process 228 and a connection pool, as described in further detail below.

The mount point 214 (i.e., /mnt/mp) is where the DBFS 220 is accessible for a mount user. A mount user is any OS user or any process that has access to the mount point 214. The mount user can operate on the mount point 214 as any directory in the OS and can perform any file system operations (e.g., create/read/update/delete file, create/remove directories, etc.) that the mount user has permission to perform.

For example, file operations directed to the mount point 214 (i.e., /mnt/mp) are sent to the VFS 202 and then to the client process 228 through the FUSE kernel module 204 and libfuse 206. A MP thread of MP resources 226 services a file operation by fetching relevant file data from the DBMS 212 and sending the file data back to the mount user through the VFS 202.

As explained earlier, a DBFS comprises a DBFS client connected to a DBMS to store and provide file data. The client device and the DBMS may be on separate computers connected via a network. With respect to the DBFS 220, the client process 228 is a DBFS client analogous to the DBFS client 104.

MP Thread Groups

In an embodiment, MP threads dedicated to a DBFS are grouped into different groups of threads, based on the nature of their work as well as what thread spawns them. The different groups of threads may include:

FUSE main thread: The FUSE main thread is the entry thread for creating a mount point.

FUSE worker threads: The FUSE worker threads are created, when required, by the FUSE main thread, to service requests of a mount user. These threads are directly responsible for file operations sent to the OS by the mount user. A FUSE worker thread connects to the DBMS 212 and fetches data using OCI or PL/SQL calls. The data is then returned to the mount user.

Worker threads: The worker threads perform work in parallel to service requests. These threads typically do not send any data to the mount user but help in pre-fetching of data that may be used by FUSE worker threads. These threads help improve the performance of OS file operations.

In an embodiment, MP resources also include a database connection pool, cached file metadata about files that are accessed by a mount user from a DBMS, such as DBMS 212, and lock management data for locking files. A database connection pool is a cache of database connections that is maintained so that the connections can be reused to connect to a DBMS to access files and file metadata stored in the DBMS.

Managing Multiple Mount Points

In an embodiment, a single client process in a "multi-mount point MFS" is used to service multiple user space file systems. The multi-mount point MFS also mounts in effect an MFS for managing the multiple user space file systems. For each user space file system, the single client process maintains, accesses, or otherwise uses separate MP resources for each managed user space file system. The number and/or amount of resources in the MP resources allotted to each managed user space file system may be dynamically adjusted, as detailed further below. FIG. 2C illustrates multi-mount point MFS according to an embodiment of the present invention.

FIG. 2C is a block diagram that depicts a multi-mount point MFS 250 (MultiMP MFS) which uses a single client process to service multiple mount points for an MFS and multiple DBFSs. The MFS is mounted at MFS mount point 218 (i.e., /mnt/mfs).

In FIG. 2C, MP threads within the client process 240 of the MultiMP MFS 250 manage multiple file system mount points 242a (i.e., /mnt/mp1), 242b (i.e., /mnt/mp2) through 242n (i.e., /mnt/mpN), which are mount points for DBFSs 238a, 238b through DBFS 238n, respectively. The MultiMP MFS 250 includes MP resources 236a, 236b through 236n, which are dedicated to the DBFSs 238a, 238b through 238n, respectively. The MP resources 236a, 236b through 236n include resources as similarly described for MP resources 216, including MP threads of the client process 240 in each of MP resources 236a, MP resources 236b through MP resources 236n.

A set of or a subset of any of MP resources 236a, 236b through 236n may be referred to herein as a set or subset of MP resources dedicated to or otherwise associated with mount points 242a (i.e., /mnt/mp1), 242b (i.e., /mnt/mp2) through 242n (i.e., /mnt/mpN), respectively. For example, MP threads servicing mount point 242a (i.e., /mnt/mp1) refer to MP threads of MP resource 236a.

Mount users can operate on the mount points 242a (i.e., /mnt/mp1), 242b (i.e., /mnt/mp2) through 242n (i.e., /mnt/mpN) as any directory in the OS and can perform any file system operations on these mount points that the mount users have permissions to perform. Files and directories of DBFS 238a, DBFS 238b through DBFS 238n are under mount points 242a (i.e., /mnt/mp1), 242b (i.e., /mnt/mp2) through 242n (i.e., /mnt/mpN), respectively, and are stored in DBMSs 232a, 232b through 232n, respectively.

File operation commands directed to the mount points 242a (i.e., /mnt/mp1), 242b (i.e., /mnt/mp2) through 242n (i.e., /mnt/mpN) are transmitted through the VFS 202 and then to the client process 240 through the FUSE kernel module 204 and libfuse 206. The file operation commands are serviced by the respective MP threads of mount points 242a (i.e., /mnt/mp1), 242b (i.e., /mnt/mp2) through 242n (i.e., /mnt/mpN) within the client process 240, such servicing including sending file data back to the mount users through the VFS 202. Unlike file commands directed to the MFS mount point 218 (i.e., /mnt/mfs), file operations directed to the mount points 242a (i.e., /mnt/mp1), 242b (i.e., /mnt/mp2) through 242n (i.e., /mnt/mpN) are not treated as overloaded commands.

The MultiMP MFS 250 also includes MFS 252 for managing any DBFS of the MultiMP MFS 250, including DBFSs 238a, 238b through 238n. The MFS 252 includes MP resources 254. Overloaded commands may be sent to the MFS 252 by directing the commands to the MFS mount point 218 (i.e., /mnt/mfs) in order to, inter alia, mount, unmount, or adjust MP resources of each mount point for any DBFS managed by the MultiMP MFS 250. For example, an overloaded command may be sent to the MFS mount point 218 (i.e., /mnt/mfs) to reduce the connections in the database connection pools of MP resources 236a of DBFS 238a. An MP thread of MP resources 254 services the overloaded command. In this way, the MFS mount point 218 (/mnt/MFS) operates as a single point of control for managing multiple DBFSs.

As explained earlier, a DBFS comprises a DBFS client connected to a DBMS to store and provide file data. The client device and the DBMS may be on separate computers connected via a network. With respect to each of the DBFS 238*a*, DBFS 238*b* through DBFS 238*n*, the respective MP threads comprise a DBFS client analogous to DBFS client 104. Each DBMS 232*a*, 232*b* through 232*n* comprises the respective DBMS connected to a DBFS client corresponding to MP threads of MP resources 236*a*, 236*b*, or 236*n*, respectively.

MP Resource Isolation

In an embodiment, MP resources within the MultiMP MFS 250 are isolated such that MP resources of mount points managed by the MultiMP MFS 250 are not shared between the MP threads of different mount points. Thus, each mount point for a DBFS has an isolated database connection pool, isolated set of MP threads, lock management data, and a global array of files. Isolated database connection pools provide isolation to files stored in a DBMS at the connection level.

Thread isolation is achieved by providing each managed mount point with its own set of dedicated MP threads. Thread isolation also facilitates thread quota management within a client process on a mount point level. Thread isolation helps to avoid any crash of an MP thread of a mount point or any denial of service (DOS) attack on a mount point from affecting the other mount points managed by the MultiMP MFS 250. DOS attacks are a common problem, often unintentionally caused, that can be avoided via thread quota enforcement. Thread quota enforcement can help limit any of mount points 242*a* (i.e., /mnt/mp1), 242*b* (i.e., /mnt/mp2) through 242*n* (i.e., /mnt/mpN) from making available too many MP threads to service requests, which might interfere with servicing of requests by the MP threads of other mount points 242*a* (i.e., /mnt/mp1), 242*b* (i.e., /mnt/mp2) through 242*n* (i.e., /mnt/mpN).

Yet another example of resource isolation is that each of MP resources 236*a*, 236*b* through 236*n* may be allotted its own isolated memory spaces. Memory isolation may be achieved by having different heaps of memory for each of MP resources 236*a*, 236*b* through 236*n*. Heaps of memory belonging to MP resources of any mount points 242*a* (i.e., /mnt/mp1), 242*b* (i.e., /mnt/mp2) through 242*n* (i.e., /mnt/mpN) are memory protected from MP threads of any other mount points 242*a* (i.e., /mnt/mp1), 242*b* (i.e., /mnt/mp2) through 242*n* (i.e., /mnt/mpN).

In general, resource isolation described above ensures problems occurring in a mount point does not affect other mount points.

In an embodiment, a global mount data structure (e.g., table) holds common context for each of DBFSs in MultiMP MFS 250. As an example, for each of the DBFSs in the MultiMP MFS 250, the global mount data structure may contain arguments used to mount the DBFS, a list of threads serving the corresponding mount point of the DBFS, heap memory context for the DBFS, and mount context that is used to access the DBFS in a backend database. An index into the global mount data structure may be used as a mount ID for a particular mount. In an embodiment, mount IDs are provided to threads such that they can access the correct context of the mount points they service from the global mount data structure. When a mount point is unmounted, context for that mount point in the global mount data structure is entirely removed.

Example DBFS Servicing Method

FIG. 3 illustrates a flow diagram 300 of a method of servicing DBFSs. At step 302, a file system command is received from a mount user. The file system command is directed to a mount point of a MultiMP MFS 250, which is implemented using a client process in the user space. The client process is a multi-threaded process, with a set of threads dedicated for each DBFS.

At step 304, the file system command is sent to the client process through the VFS 202 and the FUSE kernel 204. The file system command may be an overloaded command, in which the MultiMP MFS 250 does not respond to it as a file system command but, instead, responds by performing an operation to manage DBFSs. For example, the client process may interpret the file system command as a command to mount a DBFS.

At step 306, the client process mounts the DBFS at a DBFS mount point specified in the file system command. The DBFS mount point is linked to an appropriate DBMS by the client process. MP resources for the DBFS mount point are allocated. The allocated MP resources are resources, such as memory, threads, and database connections, dedicated for the DBFS. In an embodiment, resources are replicated for each mount point such that resources are not shared among mount points managed by the MultiMP MFS 250. Resource isolation ensures a problem in a mount point does not affect other mount points. However, the resources may be redistributed across mount points to optimize resource utilization, in an embodiment.

At step 308, the DBFS mount point is registered with the FUSE kernel 204. The FUSE kernel 204 creates a message pipe for the DBFS mount point. File system commands directed to the DBFS mount point are written to the message pipe for the DBFS mount point. The message pipe of the DBFS mount point is polled by a thread of the MP resources of the DBFS mount point for a file system command to service.

At step 310, a subsequent file system command is received from the mount user. The file system command is directed to the DBFS mount point.

At step 312, the subsequent file system command is written to the message pipe for the DBFS mount point. Unlike the file system command directed the MFS mount point, the subsequent file system command is not an overloaded file system command.

At step 314, a thread of the MP resources of the DBFS mount point accesses the subsequent file system command from the message pipe for further processing. For example, the subsequent file system is sent to the DBMS and a response from the DBMS is returned to the DBFS mount point.

Any number of DBFSs may mounted under the client process and managed by the MultiMP MFS 250 according to the steps of FIG. 3. Each mount point registered with the FUSE kernel 204 is serviced by the client process.

The client process is a single process that services multiple DBFSs across multiple DBMSs. The single process allows for easier monitoring of the multiple DBFSs than numerous processes. The single process also allows for resource sharing and quota enforcement, which are not possible across processes.

Autonomous Deployment

As discussed above, the MultiMP MFS 250 manages multiple DBFSs using a single client process that is multi-threaded. However, two or more MultiMP MFSs can be created to manage sets of DBFSs, based on user policies or usage statistics.

In an embodiment, a MultiMP MFS at a particular mount point is a single point of management to which overloaded commands may be directed to manage one or more DBFSs. Each MultiMP MFS tracks statistics on all of the DBFSs it manages. A MultiMP MFS gathers statistics from each of its managed DBFSs about their resource utilization. Example statistics collected from a DBFS may be a number of files opened, an average read/write bytes, a maximum read/write bytes, a minimum read/write bytes, a count of each file system operation (e.g., mknod, read, write, chmod, etc.), a maximum number of fuse threads, an average number of fuse threads, and the like. AN MFS daemon process collects statistics from each MultiMP MFS, via shared memory, and may use the statistics to autonomously deploy the DBFSs, such as autonomously managing and reconfiguring the DBFSs. In an embodiment, the MFS daemon process may send an overloaded command to a MultiMP MFS to obtain the statistics.

Managing the DBFSs may include be redistributing resources within a MultiMP MFS. For example, the statistics may be used to determine a heuristic to automatically rebalance outgoing database connections or automatically redistribute memory across all mount points managed by the MultiMP MFS.

Reconfiguring the DBFSs may include restructuring the DBFSs. The statistics collected on DBFSs may be used to determine a heuristic to restructure the DFBSs to dynamically adhere to user-defined isolation requirements. A restructuring example is splitting a DBFS from a MultiMP MFS. When a DBFS within a MultiMP MFS is encountering a lot of network based failures, the DBFS may be unmounted and mounted within another MultiMP MFS to prevent latencies on the other DBFSs managed by the MultiMP MFS, thereby promoting failure resilience. The DBMS may be unmounted by sending an overloaded command to the MultiMP MFS and mounted by sending a mount command to the other MultiMP MFS.

Another restructuring example is merging DBFSs from different MultiMP MFSs. The DBFSs may be merged when all DBFSs managed by the two can be managed by a single MultiMP MFS. DBFSs in one of the MultiMP MFS may be unmounted and mounted in the other MultiMP MFS. If it is determined no DBFSs are left in the MultiMP MFS from which the DBFSs were unmounted, the MultiMP MFS may be unmounted to shut it down.

The DBFSs may be autonomously reconfigured among a multi-process configuration, a multi-threaded configuration, and a multi-process multi-threaded configuration based on user policies or usage statistics. The multi-process configuration provides a better isolation of resources among DBFSs. The multi-threaded configuration provides a better utilization of resources among various DBFSs in a single process. The multi-process multi-threaded configuration provides a mixture of both the multi-threaded model and the multi-process model.

Managed Multi-Process Configuration

For purposes of scalability, isolation, and load balancing, it is useful to run a set of multiple MultiMP MFSs. It is also useful to adjust the configurations of the MultiMP MFSs dynamically and autonomously during run time to handle changing conditions. Such dynamic and autonomous adjustment of configurations is facilitated by an MFS manager. An MFS manager is an MFS that manages a set of MultiMP MFSs.

Figure 4:
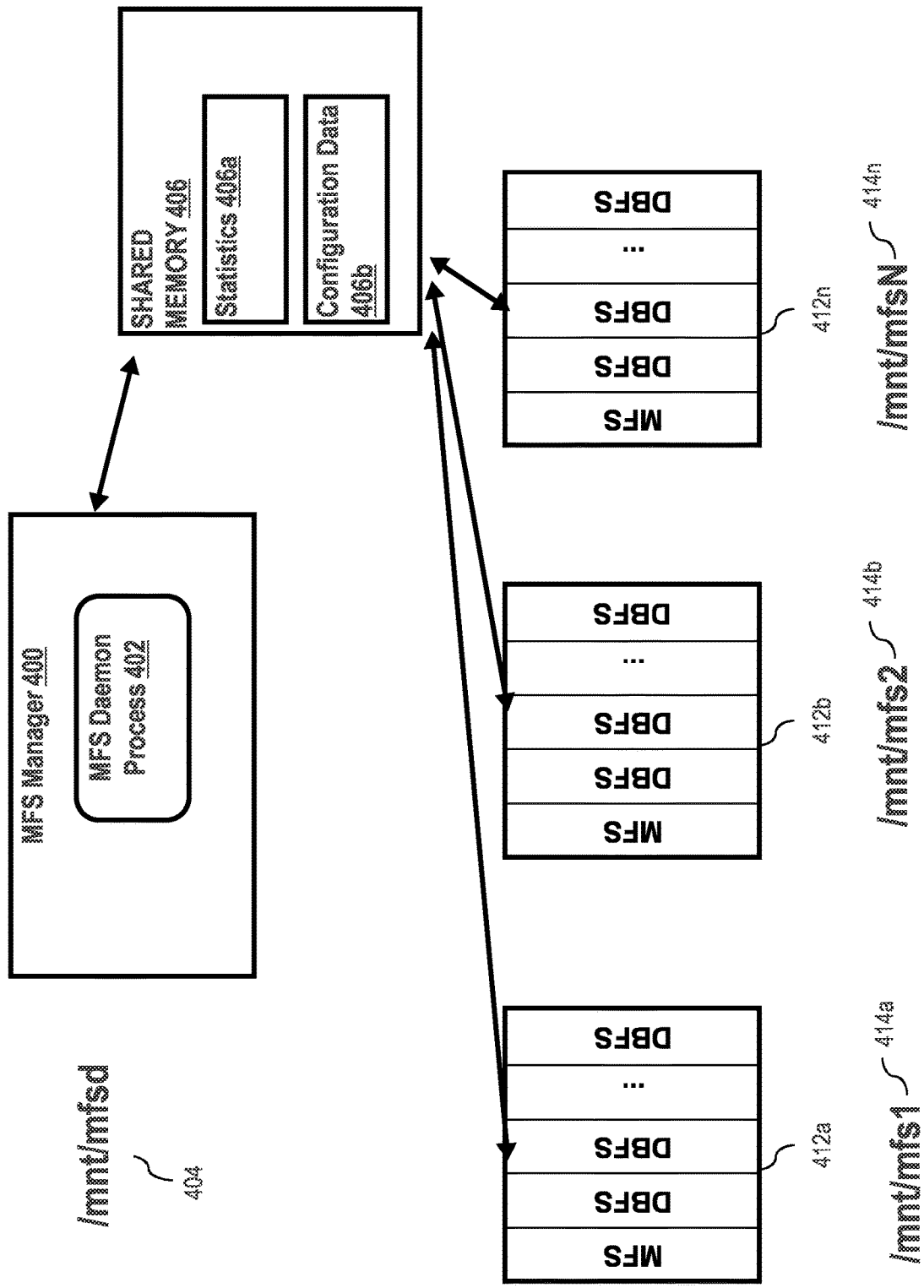
FIG. 4 illustrates a block diagram of an MFS manager.

FIG. 4 illustrates an example MFS manager 400. The MFS manager 400 includes an MFS daemon process 402 which is mounted at MFS mount point 404 (i.e., /mnt/mfsd). Similar as with an MFS or MultiMP MFS, mount users may direct overloaded commands to the mount point 404 (i.e., /mnt/mfsd). Such overloaded commands may be used to mount or unmount a MultiMP MFS, mount or unmount a DBFS within a MultiMP MFS, split one or more DBFSs managed by a MultiMP MFS with another, and/or merge DBFSs managed by multiple MultiMP MFSs into one of them.

The MFS manager 400 manages MultiMP MFS 412*a*, MultiMP MFS 412*b* through MultiMP MFS 412*n*. MFSs of the MultiMP MFS 412*a*, MultiMP MFS 412*b* through MultiMP MFS 412*n* are mounted at mount point 414*a* (i.e., /mnt/mfs1), mount point 414*b* (i.e., /mnt/mfs2) through mount point 414*n* (i.e., mnt/mfsN), respectively; the mount points of the respective DBFSs are not shown. The MultiMP MFS 412*a*, MultiMP MFS 412*b* through MultiMP MFS 412*n* may be referred to herein collectively as MultiMP MFSs 412.

Data may be shared between the MFS manager 400 and the MultiMP MFSs 412 using shared memory 406. Statistics 406*a* gathered by each of the MultiMP MFSs 412 about its respective managed DBFSs may be communicated, via the shared memory 406, with the MFS daemon process 402. The shared memory 406 is attached to the MFS daemon process 402 and client processes of the MultiMP MFSs 412.

The statistics 406*a* are used to autonomously reconfigure the managed MFSs. Example statistics gathered by a MultiMP MFS include a number of files opened, average read/write bytes, a maximum read/write bytes, a minimum read/write bytes, a count of each file system operation (e.g., mknod, read, write, chmod, etc.), a maximum number of fuse threads, an average number of fuse threads, and the like.

Configuration data 406*b* in the shared memory 406 stores data about the configurations of each of the MultiMP MFSs 412. Configuration data 406*b* may include a maximum number of DBFSs that may be serviced within a MultiMP MFS. The MFS daemon process 402 may spawn a MultiMP MFS once the limit is reached in order to mount another DBFS.

The configuration data 406*b* is available for the MFS daemon process 402 during a restart, for example, after a daemon crash. Similarly, the MFS daemon process 402 may recover any of MultiMP MFSs 412 using data stored in the configuration data 406*b*.

The configuration data 406*b* may be maintained by the MFS daemon process 402. Among the client processes of MFS Manager 400 and the MultiMP MFSs 412, the MFS daemon process 402 may be the only process with permission to modify the configuration data 406*b*.

Example Autonomous DBFS Deployment Methods

FIG. 5A illustrates a flow diagram 500 of a method for autonomously reconfiguring DBFSs mounted on MultiMP MFSs 412 using statistics 406*a*. At step 502, statistical data 406*a* is accessed. The statistical data 406*a* may be accessed by MFS daemon process 402.

At step 504, it is determined whether a particular MultiMP MFS of the plurality of MultiMP MFSs 412 satisfies one or more criteria based on the statistical data 406a for the plurality of MultiMP MFSs 412. An example criterion includes exceeding a usage limit. The usage limit may be the maximum number of files that can be opened (e.g., number of mount points serviced by a MultiMP MFS) or the maximum amount of consumed memory, CPU cycles, reads/writes for a MultiMP MFS.

At step 506, in response to determining that the particular MultiMP MFS satisfies the one or more criteria, the plurality of MultiMP MFSs 412 is restructured. For example, a particular DBFS is unmounted from the particular MultiMP MFS and mounted under another of MultiMP MFSs 412 or of a newly created MultiMP MFS. If the particular MultiMP MFS is no longer managing any DBFSs, then the client process of the particular MFS may be closed.

In an embodiment, the MFS daemon process 402 manages the plurality of MultiMP MFSs 412, based on the statistical data 406a, by autonomously reconfiguring the DBFSs therein to dynamically adhere to user defined isolation requirements.

Figure 5B:
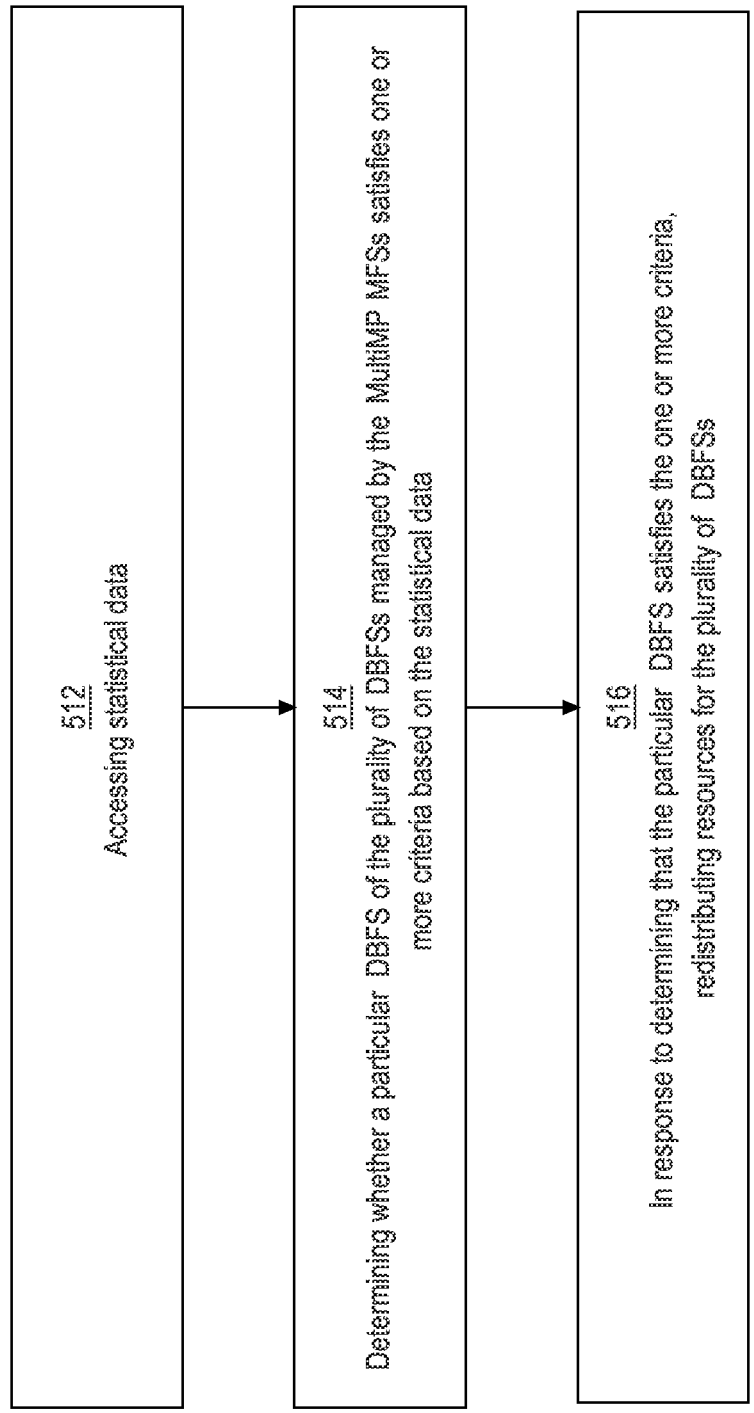

FIG. 5B illustrates a flow diagram 510 of a method of autonomously managing DBFSs mounted on MultiMP MFSs 412 using statistics 406a. At step 512, statistical data 406a is accessed. The statistical data 406a may be accessed by MFS daemon process 402.

At step 514, it is determined whether a particular DBFS of the plurality of DBFSs managed by the MultiMP MFSs 412 satisfies one or more criteria based on the statistical data 406a. An example criteria includes exceeding a usage limit. The usage limit may be the maximum number of database connections or the maximum amount of consumed memory, CPU cycles, reads/writes for a DBFS.

At step 516, in response to determining that the particular DBFS satisfies the one or more criteria, resources are redistributed for the plurality of DBFSs. For example, within the MP resources allotted the particular DBFS, MP threads may be created or removed, or database connections may be added to or removed from a database connection pool.

DBMS Overview

Embodiments of the present invention are used in the context of DBMSs. Therefore, a description of a DBMS is useful.

A DBMS 108 manages a database. The DBMS 108 may comprise one or more database servers 110. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server 110 of a DBMS 108 by submitting to the database server 110 commands that cause the database server to perform operations on data stored in a database. A user may be one or more applications running on a client computer that interact with a database server 110. Multiple users may also be referred to herein collectively as a user.

A database command may be in the form of a database statement that conforms to a database language. A database language for expressing the database commands is SQL. There are many different versions of SQL, some versions are standard and some proprietary, and there are a variety of extensions. DDL commands are issued to a database server 110 to create or configure database objects, such as tables, views, or complex data types. SQL/XML is a common extension of SQL used when manipulating XML data in an object-relational database. PL/SQL is another extension of SQL for querying and updating data in a relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server 110. A server, such as a database server 110, is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data.

The database dictionary is modified according to DDL commands issued to add, modify, or delete database objects. For example, in response to receiving a DDL statement to create table person, a database server alters metadata in a database dictionary to define table and its columns. A database dictionary is referred to by a DBMS 108 to determine how to execute database commands submitted to a DBMS 108. Thus, when a DML statement is received by a database server 110 to insert rows with a value in a sparse column, the database server 110 consults the database dictionary to determine that the column is sparse and stores that values.

A DBMS 108 receives queries issued against a database object managed by a database system. A query optimizer associated with the database system may generate one or more different candidate execution plans for a query, which are evaluated by the query optimizer to determine which execution plan should be used to compute the query.

Hardware Overview

Referring now to FIG. 6, it is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or another processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the worldwide packet data communication network now commonly referred to as the "Internet" 628. Local network(s) 622 and Internet 628 use electrical, electromagnetic, or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Software Overview

FIG. 7 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms, and their implementation.

In the foregoing specification, the example embodiments) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
receiving statistical data from at least one manager file system (MFS);
wherein the at least one MFS is mounted within an operating system at a mount point within a file hierarchy that is maintained by the operating system;
wherein the at least one MFS manages one or more database file systems (DBFSs);
determining whether the at least one MFS satisfies one or more criteria based on the statistical data;
in response to determining that the at least one MFS satisfies the one or more criteria, autonomously modifying a configuration of the at least one MFS to manage the one or more DBFSs.

2. The method of claim 1, wherein autonomously modifying the configuration of the at least one MFS includes unmounting a particular DBFS from a first process of a first MFS of the at least one MFS and mounting the particular DBFS under a second process of a second MFS of the at least one MFS.

3. The method of claim 2, wherein autonomously modifying the configuration of the at least one MFS further includes closing the first process of the first MFS.

4. The method of claim 1, wherein autonomously modifying the configuration of the at least one MFS includes redistributing resources within a particular MFS of the at least one MFS.

5. The method of claim 1, wherein the statistical data includes usage statistics gathered on each DBFS of the at least one MFS.

6. The method of claim 1, wherein the at least one MFS is implemented using a separate process, wherein the separate process is multi-threaded with a set of threads dedicated to each of the one or more DBFSs managed by a respective MFS.

7. The method of claim 1, wherein resources for a particular DBFS managed by the at least one MFS are isolated from other DBFSs managed by the at least one MFS.

8. The method of claim 1, wherein the one or more criteria include exceeding a usage limit.

9. The method of claim 1, further comprising storing configuration data of the at least one MFS in a shared memory.

10. The method of claim 9, further comprising restoring a specific MFS using the configuration data stored in the shared memory.

11. One or more non-transitory computer-readable storage media storing one or more sequences of program instructions which, when executed by one or more computing devices, cause:
receiving statistical data from at least one manager file system (MFS);
wherein the at least one MFS is mounted within an operating system at a mount point within a file hierarchy that is maintained by the operating system;
wherein the at least one MFS manages one or more database file systems (DBFSs);
determining whether the at least one MFS satisfies one or more criteria based on the statistical data;
in response to determining that the at least one MFS satisfies the one or more criteria, autonomously modifying a configuration of the at least one MFS to manage the one or more DBFSs.

12. The one or more non-transitory computer-readable storage media of claim 11, wherein autonomously modifying the configuration of the at least one MFS includes unmounting a particular DBFS from a first process of a first MFS of the at least one MFS and mounting the particular DBFS under a second process of a second MFS of the at least one MFS.

13. The one or more non-transitory computer-readable storage media of claim 12, wherein autonomously modifying the configuration of the at least one MFS further includes closing the first process of the first MFS.

14. The one or more non-transitory computer-readable storage media of claim 11, wherein autonomously modifying the configuration of the at least one MFS includes redistributing resources within a particular MFS of the at least one MFS.

15. The one or more non-transitory computer-readable storage media of claim 11, wherein the statistical data includes usage statistics gathered on each DBFS of the at least one MFS.

16. The one or more non-transitory computer-readable storage media of claim 11, wherein the at least one MFS is implemented using a separate process, wherein the separate process is multi-threaded with a set of threads dedicated to each of the one or more DBFSs managed by a respective MFS.

17. The one or more non-transitory computer-readable storage media of claim 11, wherein resources for a particular DBFS managed by the at least one MFS are isolated from other DBFSs managed by the at least one MFS.

18. The one or more non-transitory computer-readable storage media of claim 11, wherein the one or more criteria include exceeding a usage limit.

19. The one or more non-transitory computer-readable storage media of claim 11, wherein the one or more sequences of program instructions which, when executed by the one or more computing devices, further cause storing configuration data of the at least one MFS in a shared memory.

20. The one or more non-transitory computer-readable storage media of claim 19, wherein the one or more sequences of program instructions which, when executed by the one or more computing devices, further cause restoring a specific MFS using the configuration data stored in the shared memory.

* * * * *